(12) United States Patent
Butterworth et al.

(10) Patent No.: US 9,241,128 B2
(45) Date of Patent: Jan. 19, 2016

(54) VIDEO CONVERSION TECHNOLOGY

(71) Applicant: Warner Bros. Entertainment Inc., Burbank, CA (US)

(72) Inventors: William Evans Butterworth, Los Angeles, CA (US); Roger Raymond Dwinell, Canyon Country, CA (US); Valerie McMahon, Castaic, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 13/767,440

(22) Filed: Feb. 14, 2013

(65) Prior Publication Data

US 2014/0226065 A1 Aug. 14, 2014

(51) Int. Cl.
*H04N 7/01* (2006.01)
*H04N 19/85* (2014.01)
*H04N 21/23* (2011.01)
*H04N 21/44* (2011.01)
*H04N 21/2343* (2011.01)
*H04N 21/4402* (2011.01)

(52) U.S. Cl.
CPC ........... *H04N 7/0125* (2013.01); *H04N 7/0117* (2013.01); *H04N 19/85* (2014.11); *H04N 21/234363* (2013.01); *H04N 21/440263* (2013.01)

(58) Field of Classification Search
USPC .................................................. 348/441, 445
See application file for complete search history.

(56) References Cited

U.S. PATENT DOCUMENTS

| | | |
|---|---|---|
| 4,285,004 A | 8/1981 | Morrison et al. |
| 4,320,414 A | 3/1982 | Miyaji et al. |
| 4,641,244 A | 2/1987 | Wilson et al. |
| 4,832,485 A | 5/1989 | Bowles |
| 4,849,914 A | 7/1989 | Medioni et al. |
| 4,890,160 A | 12/1989 | Thomas |
| 5,022,089 A | 6/1991 | Wilson |
| 5,023,815 A | 6/1991 | Wilson et al. |
| 5,129,009 A | 7/1992 | Lebeau |
| 5,161,035 A | 11/1992 | Muramatsu |
| 5,233,670 A | 8/1993 | Dufour et al. |
| 5,315,413 A | 5/1994 | Yamamoto et al. |
| 5,325,190 A | 6/1994 | Nagasaki et al. |
| 5,418,574 A | 5/1995 | Miyabata et al. |
| 5,475,428 A | 12/1995 | Hintz et al. |

(Continued)

FOREIGN PATENT DOCUMENTS

| | | |
|---|---|---|
| JP | 61231557 | 10/1986 |
| JP | 63182961 | 7/1988 |

(Continued)

OTHER PUBLICATIONS

U.S. Appl. No, 62/664,552, filed Jul. 24, 2001, McGuire.

(Continued)

*Primary Examiner* — Michael Teitelbaum
(74) *Attorney, Agent, or Firm* — Fish & Richardson P.C.

(57) ABSTRACT

Video conversion technology, in which a first stream of video content is accessed and multiple, different layers are extracted from the first stream of the video content. Each of the multiple, different layers are separately processed to convert the multiple, different layers into modified layers that each have a higher resolution. The modified layers are reassembled into a second stream of the video content that has a higher resolution than the first stream of the video content.

12 Claims, 7 Drawing Sheets

(56) References Cited

U.S. PATENT DOCUMENTS

| | | |
|---|---|---|
| 5,517,234 A | 5/1996 | Gerber et al. |
| 5,548,326 A | 8/1996 | Michael |
| 5,608,466 A | 3/1997 | Nakamoto |
| 5,630,037 A | 5/1997 | Schindler |
| 5,640,200 A | 6/1997 | Michael |
| 5,641,596 A | 6/1997 | Gray et al. |
| 5,682,440 A | 10/1997 | Yukawa |
| 5,734,915 A | 3/1998 | Roewer |
| 5,781,666 A | 7/1998 | Ishizawa et al. |
| 5,812,214 A | 9/1998 | Miller |
| 5,892,554 A | 4/1999 | DiCicco et al. |
| 5,905,819 A | 5/1999 | Daly |
| 5,917,987 A | 6/1999 | Neyman |
| 5,920,657 A | 7/1999 | Bender et al. |
| 5,926,568 A | 7/1999 | Chaney et al. |
| 6,002,424 A | 12/1999 | Rapa et al. |
| 6,075,905 A | 6/2000 | Herman et al. |
| 6,097,833 A | 8/2000 | Lobregt et al. |
| 6,115,071 A | 9/2000 | Hurst et al. |
| 6,128,046 A | 10/2000 | Totsuka et al. |
| 6,195,132 B1 | 2/2001 | Kimura et al. |
| 6,282,326 B1 | 8/2001 | Lee et al. |
| 6,295,083 B1 | 9/2001 | Kuhn |
| 6,317,223 B1 | 11/2001 | Rudak et al. |
| 6,323,934 B1 | 11/2001 | Enomoto |
| 6,373,970 B1 | 4/2002 | Dong et al. |
| 6,393,150 B1 | 5/2002 | Lee et al. |
| 6,445,816 B1 | 9/2002 | Pettigrew |
| 6,539,120 B1 | 3/2003 | Sita et al. |
| 6,549,576 B1 | 4/2003 | Moriyoshi |
| 6,587,509 B1 | 7/2003 | Suzuki et al. |
| 6,610,387 B1 | 8/2003 | Torli et al. |
| 6,646,764 B1 | 11/2003 | Wataya |
| 6,704,045 B1 | 3/2004 | Brett |
| 6,713,242 B2 | 3/2004 | Burlin |
| 6,765,609 B1 | 7/2004 | Kinoshita |
| 6,792,071 B2 | 9/2004 | Dewaele |
| 6,816,604 B2 | 11/2004 | Young et al. |
| 6,870,564 B1 | 3/2005 | Burns |
| 6,874,420 B2 | 4/2005 | Lewis et al. |
| 6,944,354 B2 | 9/2005 | Groschup et al. |
| 6,947,607 B2 | 9/2005 | Perlmutter et al. |
| 6,956,607 B2 | 10/2005 | Mizuno et al. |
| 6,969,991 B2 | 11/2005 | Bammer et al. |
| 7,006,881 B1 | 2/2006 | Hoffberg et al. |
| 7,011,727 B2 | 3/2006 | Torli et al. |
| 7,092,584 B2 | 8/2006 | Perlmutter et al. |
| 7,239,757 B2 | 7/2007 | Kang et al. |
| 7,242,988 B1 | 7/2007 | Hoffberg et al. |
| 7,245,783 B2 | 7/2007 | Fielding |
| 7,272,268 B2 | 9/2007 | Perlmutter et al. |
| 7,280,707 B2 | 10/2007 | Perlmutter et al. |
| 7,333,670 B2 | 2/2008 | Sandrew |
| 7,346,109 B2 | 3/2008 | Nair et al. |
| 7,393,994 B2 | 7/2008 | Masliah et al. |
| 7,408,569 B1 | 8/2008 | Yamaguchi |
| 7,486,842 B2 | 2/2009 | Perlmutter et al. |
| 7,672,541 B2 | 3/2010 | Perlmutter et al. |
| 8,032,477 B1 | 10/2011 | Hoffberg et al. |
| 8,092,908 B2 | 1/2012 | Ohta et al. |
| 8,094,972 B2 | 1/2012 | Perlmutter et al. |
| 8,120,960 B2 | 2/2012 | Varkony |
| 8,165,916 B2 | 4/2012 | Hoffberg et al. |
| 8,401,337 B2 | 3/2013 | Perlmutter et al. |
| 2001/0026683 A1* | 10/2001 | Morimoto et al. ............... 396/89 |
| 2004/0036923 A1 | 2/2004 | Kokemohr et al. |
| 2004/0062517 A1* | 4/2004 | Sakai ............................. 386/40 |
| 2006/0114354 A1* | 6/2006 | Koyanagi et al. ............. 348/581 |
| 2008/0292200 A1 | 11/2008 | Kjeldsen et al. |
| 2009/0041123 A1 | 2/2009 | Haskell |
| 2009/0083813 A1* | 3/2009 | Dolce et al. ..................... 725/93 |
| 2010/0123806 A1 | 5/2010 | Li et al. |
| 2011/0164676 A1 | 7/2011 | Ozawa |
| 2013/0038790 A1* | 2/2013 | Seetzen et al. ................ 348/453 |
| 2013/0230238 A1 | 9/2013 | Perlmutter et al. |

FOREIGN PATENT DOCUMENTS

| | | |
|---|---|---|
| JP | 5205042 | 8/1993 |
| JP | 6233144 | 8/1994 |
| JP | 02501417 | 5/1996 |
| JP | 11161773 | 6/1996 |
| JP | 11261832 | 9/1999 |
| JP | 2000236552 | 8/2000 |
| JP | 2001333287 | 11/2001 |
| JP | 2002344724 | 11/2002 |
| WO | WO 89/03051 | 4/1989 |

OTHER PUBLICATIONS

Ball, J.A., "The Technicolor Process of Three-Color Cinematography," Journal of Motion Picture Engineers, [online]. vol. XXV, No. 2, Aug. 1935, pp. 127-138. [retrieved on Dec. 18, 2002]. Retrieved from the Internet: URL:http://www.widescreenmuseum.com/oldcolor/ball.htm> 9 pages.

Boult, T.E., and Wolberg, G., "Correcting Chromatic Aberrations Using Image Warping," Proceedings of DARPA92, pp. 363-377.

Brown, Lisa G., "A Survey of Image Registration Techniques," ACM Computing Surveys, vol. 24, No. 4, pp. 325-376, 1992.

Canny, John, "A Computational Approach to Edge Detection," IEEE Tranactions on Pattern Analysis and Machine Intelligence, vol. PAMI-8, No. 6, Nov. 1986, pp. 679-698.

Li, H., et al., "A Contour-Based Approach to Multisensor Image Registration," IEEE Transactions on Image Processing, vol. 4, No. 3, Mar. 1995, pp. 320-334.

Srinivasan, S., et al., "Mist: Multispectral Image Similarity Transformation," LNK Home Page, pp. 1 20, printed Dec. 12, 2001.

"Technicolor," [online]. [retrieved on Dec. 18, 2002]. Retrieved from the Internet: <URL:http://www.everything2.com/index.pl?node=Technicolor> 3 pages.

"The Wide Screen Time Machine: Mechanix Illustrated Mar. 1939, How the Technicolor Camera Works," [online]. [retrieved on Dec. 18, 2002]. Retrieved from the Internet: <URL:http://www.widescreenmuseum.com/widescreen/mi-techcamera.htm> 3 pages.

International Search Report and Written Opinion in International Application No. PCT/US2014/016069, dated May 29, 2014, 12 pages.

\* cited by examiner

VIDEO CONVERSION TECHNOLOGY

FIELD

This disclosure relates to video conversion technology.

BACKGROUND

From the 1980s to late 1990s, television production used multiple video camera technologies in order to minimize production budgets. This method of production, known as the NTSC (or National Television System Committee) format, allowed for lower budgeted programming recorded in either single camera or multicam camera setups. The camera specifications had limitations, especially from a long term archive standpoint.

These systems were based on a R, G, B colorimetry platform (Red, Green, Blue) with a 29.97 frame rate and 525 lines of resolution. In comparison, Modern High Definition techniques have 1080 lines of resolution and run at a speed of 23.98.

To convert NTSC video into Modern High Definition (HD), an "upconversion" process has been used. The "upconversion" process acquires an NTSC signal and simply "upconverts" or "blow ups" the image. This process addressed the dimensions and speed, but not the aliasing and increase of noise in the image. The "upconversion" was popularized in the 1990s when HD was first being sold.

SUMMARY

In one aspect, a method includes accessing a first stream of video content, the first stream of the video content having a first resolution. The method also includes extracting, from the first stream of the video content, multiple, different layers that each have the first resolution and separately processing each of the multiple, different layers to convert the multiple, different layers into modified layers that each have a second resolution that is higher than the first resolution. The method further includes reassembling, by at least one processor, the modified layers into a second stream of the video content storing, in electronic storage, the second stream of the video content. The second stream of the video content has the second resolution that is higher than the first resolution.

Implementations may include one or more of the following features. For example, the method may include extracting, from the first stream of the video content, multiple, different color layers that each correspond to a different color, separately processing each of the multiple, different color layers to convert the multiple, different color layers into modified color layers that each correspond to a different color, and reassembling the modified color layers into a second stream of the video content.

In some implementations, the method may include extracting, from the first stream of the video content, a first layer, extracting, from the first stream of the video content, a second layer that is different than the first layer, and extracting, from the first stream of the video content, a third layer that is different than the first layer and the second layer. In these implementations, the method may include processing the first layer to convert the first layer into a modified first layer, processing the second layer to convert the second layer into a modified second layer that is different than the modified first layer, processing the third layer to convert the third layer into a modified third layer that is different than the modified first layer and the modified second layer, and reassembling the modified first layer, the modified second layer, and the modified third layer into a second stream of the video content.

The method may include extracting, from the first stream of the video content, first images of a scene, extracting, from the first stream of the video content, second images of the scene, and extracting, from the first stream of the video content, third images of the scene. The second images of the scene may be a different representation of the scene than the first images of the scene and the third images of the scene may be a different representation of the scene than the first images of the scene and the second images of the scene. The method also may include processing the first images of the scene to convert the first images of the scene into modified first images of the scene that have a higher resolution than the first images of the scene, processing the second images of the scene to convert the second images of the scene into modified second images of the scene that have a higher resolution than the second images of the scene, and processing the third images of the scene to convert the third images of the scene into modified third images of the scene that have a higher resolution than the third images of the scene. The method further may include reassembling the modified first images of the scene, the modified second images of the scene, and the modified third images of the scene into a second stream of the video content.

In some examples, the method may include extracting, from the first stream of the video content, a first color layer, extracting, from the first stream of the video content, a second color layer that is different than the first color layer, and extracting, from the first stream of the video content, a third color layer that is different than the first color layer and the second color layer. In these examples, the method may include processing the first color layer to convert the first color layer into a modified first color layer, processing the second color layer to convert the second color layer into a modified second color layer that is different than the modified first color layer, and processing the third color layer to convert the third color layer into a modified third color layer that is different than the modified first color layer and the modified second color layer. Further, in these examples, the method may include reassembling the modified first color layer, the modified second color layer, and the modified third color layer into the second stream of the video content.

In some implementations, the method may include extracting, from the first stream of the video content, a red color layer, extracting, from the first stream of the video content, a green color layer that is different than the red color layer, and extracting, from the first stream of the video content, a blue color layer that is different than the red color layer and the green color layer. In these implementations, the method may include processing the red color layer to convert the red color layer into a modified red color layer, processing the green color layer to convert the green color layer into a modified green color layer that is different than the modified red color layer, and processing the blue color layer to convert the blue color layer into a modified blue color layer that is different than the modified red color layer and the modified green color layer. In addition, in these implementations, the method may include reassembling the modified red color layer, the modified green color layer, and the modified blue color layer into the second stream of the video content.

Also, the method may include identifying red color values in the first stream of the video content and separating the identified red color values into the red color layer. The method may include identifying green color values in the first stream of the video content and separating the identified green color values into the green color layer. The method may include identifying blue color values in the first stream of the video content and separating the identified blue color values into the blue color layer.

In some examples, the method may include extracting, from the first stream of the video content, first images of a scene that reflect red color values of the scene, extracting, from the first stream of the video content, second images of the scene that reflect green color values of the scene, and extracting, from the first stream of the video content, third images of the scene that reflect blue color values of the scene. In these examples, the method may include processing the first images of the scene to convert the first images of the scene into modified first images of the scene that reflect red color values of the scene at a higher resolution than the first images of the scene, processing the second images of the scene to convert the second images of the scene into modified second images of the scene that reflect green color values of the scene at a higher resolution than the second images of the scene, and processing the third images of the scene to convert the third images of the scene into modified third images of the scene that reflect blue color values of the scene at a higher resolution than the third images of the scene. Further, in these examples, the method may include reassembling the modified first images of the scene, the modified second images of the scene, and the modified third images of the scene into the second stream of the video content.

The method may include separately performing a blurring process on each of the multiple, different layers and, after performing the blurring process on each of the multiple, different layers, converting the multiple, different layers into modified layers that each have the second resolution that is higher than the first resolution. The method also may include separately performing a sharpening process on each of the multiple, different layers and, after performing the sharpening process on each of the multiple, different layers, converting the multiple, different layers into modified layers that each have the second resolution that is higher than the first resolution. The method further may include separately performing a chromatic adjustment process on each of the multiple, different layers and, after performing the chromatic adjustment process on each of the multiple, different layers, converting the multiple, different layers into modified layers that each have the second resolution that is higher than the first resolution.

In addition, the method may include separately performing a de-interlace process on each of the multiple, different layers and, after performing the de-interlace process on each of the multiple, different layers, converting the multiple, different layers into modified layers that each have the second resolution that is higher than the first resolution. The method may include separately converting each of the multiple, different layers into modified layers that each have the second resolution that is higher than the first resolution and, after converting each of the multiple, different layers, changing a speed of each of the modified layers.

In some implementations, the method may include extracting, from the first stream of the video content, multiple, different color layers that each correspond to a different color and separately processing each of the multiple, different color layers to convert the multiple, different color layers into modified color layers that each correspond to a different color. In these implementations, the method may include reassembling the modified color layers into a second stream of the video content by performing a chromatic level adjustment process that weights, in the second stream of the video content, a first color layer included in the modified color layers more heavily than a second, different color layer included in the modified color layers.

In addition, the method may include identifying features that are present in each of the modified layers and using the identified features to align the modified layers in the second stream of the video content. The method may include accessing a first video signal in NTSC (National Television System Committee) format and reassembling the modified layers into a second video signal in a high definition format that has a higher resolution than the first video signal in the NTSC format. The method also may include accessing a standard definition television video program and reassembling the modified layers into a modified high definition television video program.

In some examples, the method may include accessing a first stream of video content with a 29.97 frame rate and 525 lines of resolution, the first stream of video content being based on a red, green, and blue colorimetry platform. In these examples, the method may include extracting, from the first stream of the video content, red, green, and blue layers that each have a 29.97 frame rate and 525 lines of resolution and separately processing each of the red, green, and blue layers to convert the red, green, and blue layers into modified red, green, and blue layers that each have a 23.98 frame rate and 1080 lines of resolution. Also, in these examples, the method may include reassembling the modified red, green, and blue layers into a second stream of the video content with a 23.98 frame rate and 1080 lines of resolution.

In another aspect, a video conversion system includes at least one processor and at least one memory coupled to the at least one processor having stored thereon instructions which, when executed by the at least one processor, causes the at least one processor to perform operations. The operations include accessing a first stream of video content, the first stream of the video content having a first resolution. The operations also include extracting, from the first stream of the video content, multiple, different layers that each have the first resolution and separately processing each of the multiple, different layers to convert the multiple, different layers into modified layers that each have a second resolution that is higher than the first resolution. The operations further include reassembling the modified layers into a second stream of the video content and storing, in electronic storage, the second stream of the video content. The second stream of the video content has the second resolution that is higher than the first resolution.

In yet another aspect, at least one computer-readable storage medium is encoded with executable instructions that, when executed by at least one processor, cause the at least one processor to perform operations. The operations include accessing a first stream of video content, the first stream of the video content having a first resolution. The operations also include extracting, from the first stream of the video content, multiple, different layers that each have the first resolution and separately processing each of the multiple, different layers to convert the multiple, different layers into modified layers that each have a second resolution that is higher than the first resolution. The operations further include reassembling the modified layers into a second stream of the video content and storing, in electronic storage, the second stream of the video content. The second stream of the video content has the second resolution that is higher than the first resolution.

The details of one or more implementations are set forth in the accompanying drawings and the description, below. Other potential features of the disclosure will be apparent from the description and drawings, and from the claims.

DETAILED DESCRIPTION

Techniques are described for converting a lower resolution video signal into a higher resolution video signal. A process divides a single NTSC signal into three unique red, green, and blue images for cleanup and filtering in individual layers. Once each sequence is restored, the files are merged back into one video stream to create a modified HD representation of the NTSC signal.

Figure 1:
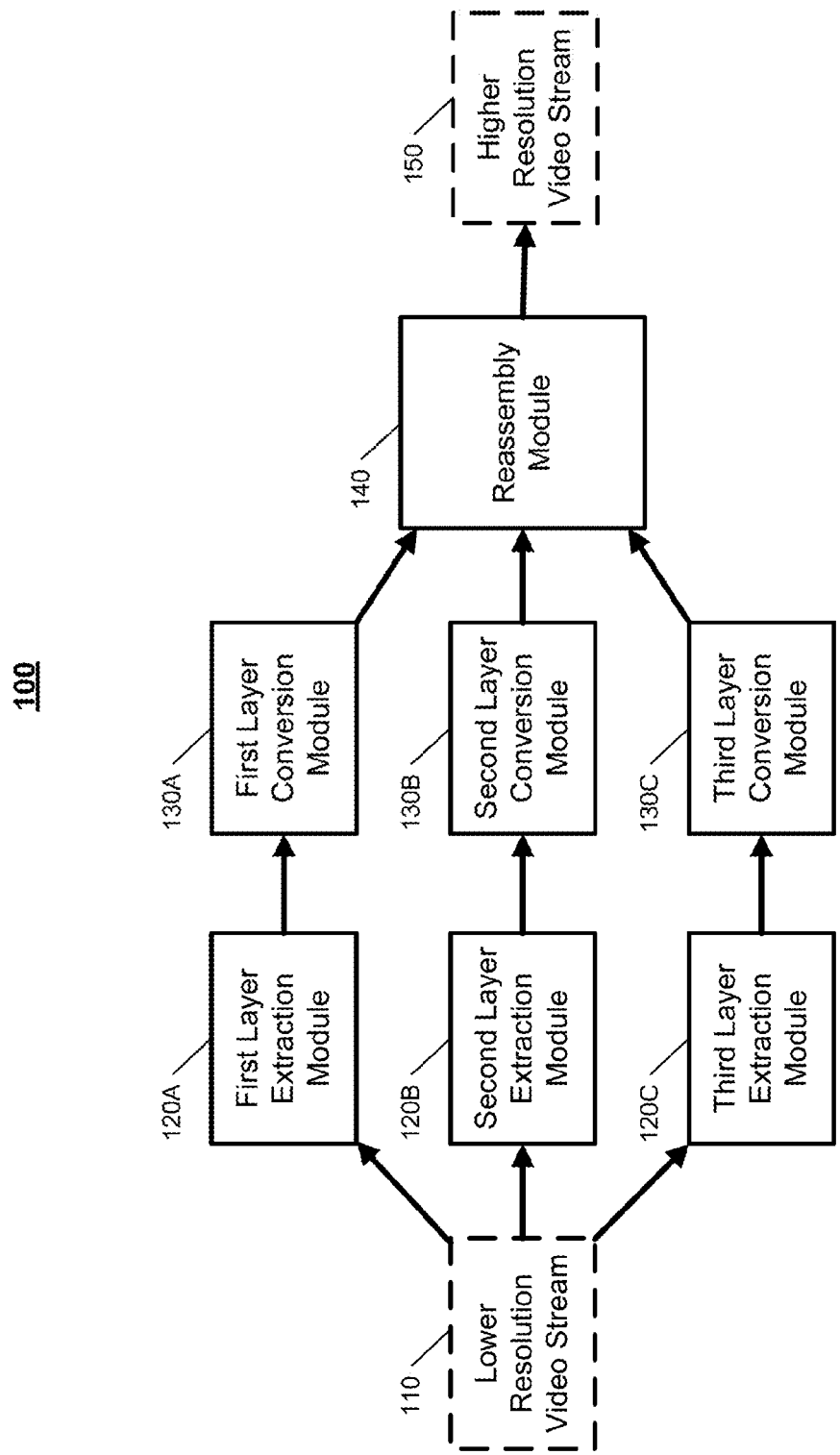
FIGS. 1, 2, and 7 are diagrams of exemplary systems.

FIG. 1 illustrates an exemplary system 100 for converting a lower resolution video stream 110 into a higher resolution video stream 150. The lower resolution video stream 110 can be, for example, in the NTSC format or can be a standard definition television video program. The higher resolution video stream 150 can be, for example, in HD format.

Multiple, different layers can be extracted from the lower resolution video stream 110. Each of the multiple, different layers can have the same resolution as the lower resolution video stream 110 or can be converted into layers of different resolution. For example, a first layer extraction module 120A, a second layer extraction module 120B, and a third layer extraction module 120C can extract and convert first, second, and third layers, respectively.

Each of the extracted layers can be separately processed to convert a respective extracted layer into a respective modified layer. Modified layers can, for example, have a same resolution as the higher resolution video stream 150. For example, a first layer conversion module 130A, a second layer conversion module 130B, and a third layer conversion module 130C can convert the first, second, and third layers into first, second, and third modified layers, respectively. A reassembly module 140 can reassemble the first, second, and third modified layers into the higher resolution video stream 150.

In converting or modifying the layers, a transcoding process can be used to convert from a first format signal to a second format signal. For example, in some implementations, the first format signal can be a 4:2:2 standard definition digital video source which can be associated with a Y'CbCr color space and the second format signal can be a 4:4:4 high definition digital video source that is associated with a RGB color space. The "4" in the "4:2:2" label represents a luminance of the first format signal and the "2:2" in the "4:2:2" label represents color difference signals associated with the first format signal. Similarly, the "4:4:4" label represents the three primary colors R,G,B. In addition, other picture techniques may be used, which include 4:2:0. In "4:2:0," the "0" represents a non-sampled value. This non sampled value, when transcoded, can represent an actual value based on the mathematical differences between the "4:2" or luminance and first color samples. Increasing the value from a "0" value using neighboring values may enable information to be manipulated to create a higher value or a better overall image.

The first format signal can use a "lossy" scheme which is used to save space in transmission or recording systems. For example, the first format signal can support 10,648,000 colors while the second format signal can support 16,777,000 colors. In some implementations, the first format signal is an 8-bit signal and the second format signal is a 10-bit signal. In such implementations, the transcoding process can transcode an 8-bit standard definition signal into a 10-bit high definition digital. The larger color space associated with the high definition signal can enable subsequent processes to manipulate the high definition signal for visual improvement, such as in frequency and time domains, which can result in improved quality in the high definition signal as compared to the standard definition signal.

Figure 2:
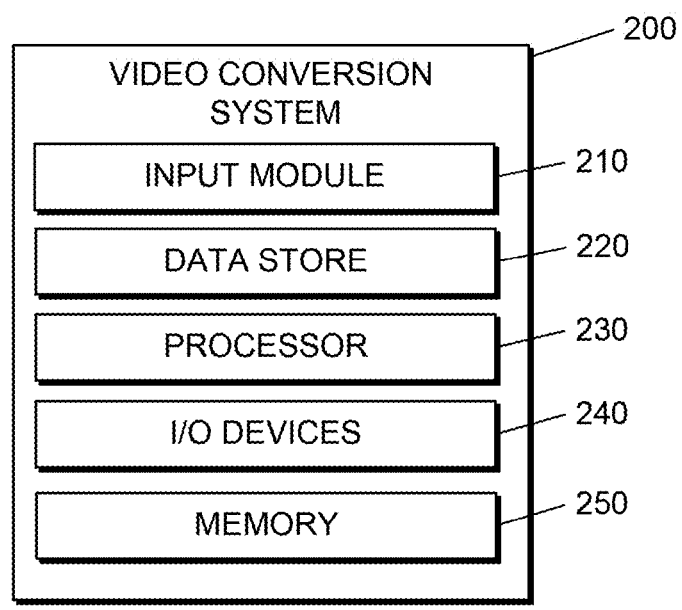

FIG. 2 illustrates an exemplary video conversion system 200. The system 200 includes an input module 210, a data store 220, one or more processors 230, one or more I/O (Input/Output) devices 240, and memory 250. The input module 220 may be used to input any type of information used in video conversion. For example, the input module 210 may be used to receive video data or receive data describing how video data stored in the data store 220 is to be processed during conversion. In some implementations, data from the input module 210 is stored in the data store 220. The data included in the data store 220 may include, for example, any type of video data (e.g., images, streams, etc.) and parameters that define how video conversion processes operate.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Other types of data files and/or database technologies may be used. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
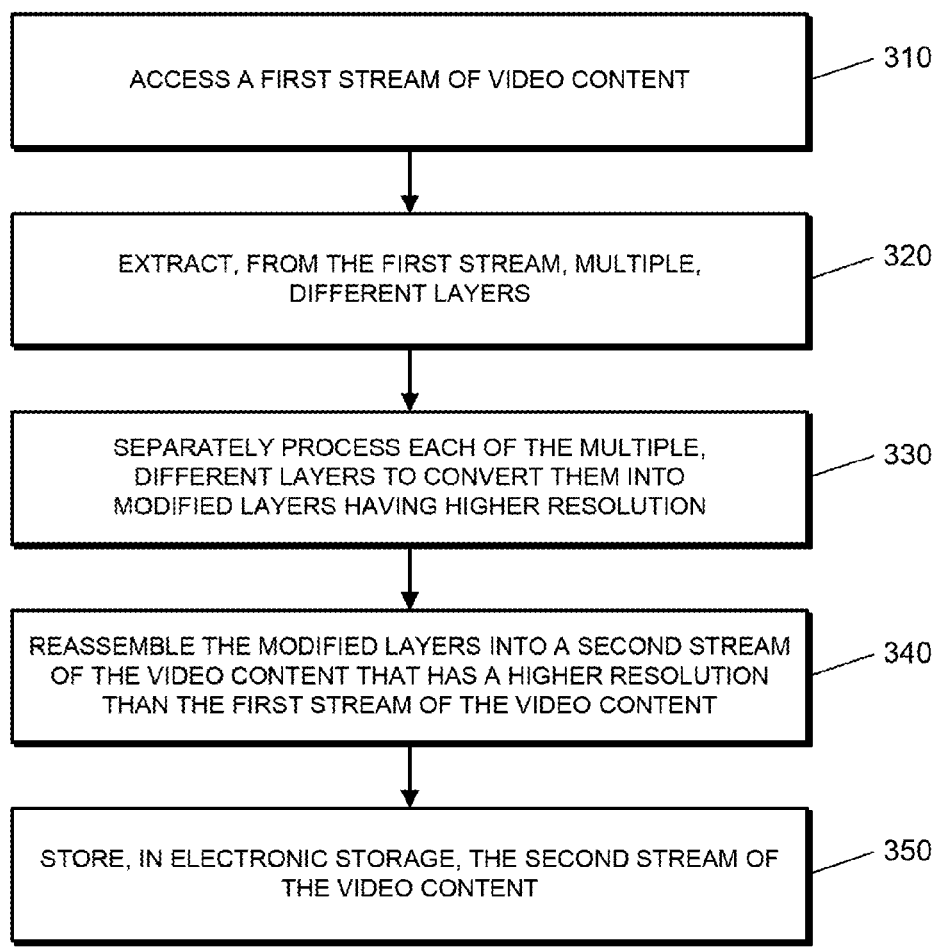
FIGS. 3 and 4 are flowcharts of exemplary processes.
Figure 4:
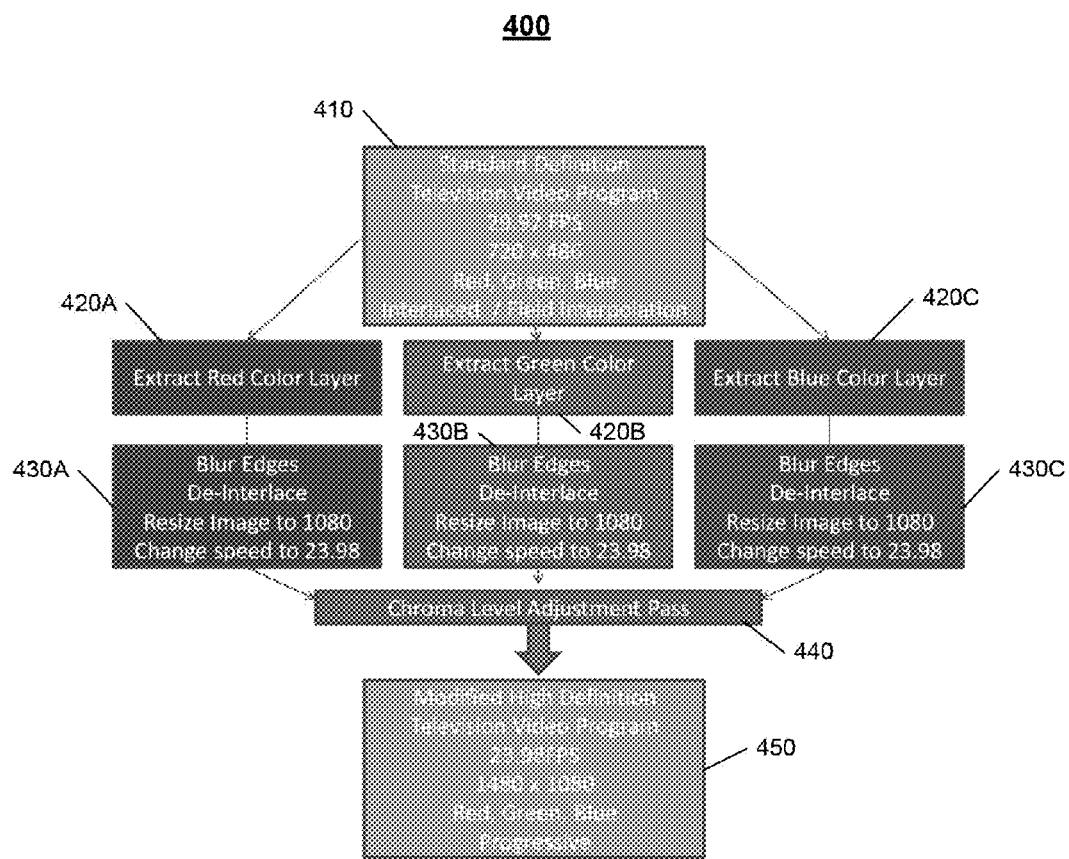

FIGS. 3 and 4 illustrate processes 300 and 400, respectively, for increasing resolution of a video stream. The operations of the processes 300 and 400 are described generally as being performed by the system 200. In some implementations, operations of the process 300 and/or the process 400 may be performed by one or more components of the system 100. Operations of the process 300 and/or the process 400 also may be performed by one or more processors included in one or more electronic devices.

Referring to FIG. 3, the system 200 accesses a first stream of video content (310). For instance, the system 200 can access a first stream of the video content that has a first resolution. As a more particular example, the system 200 can access a video signal in NTSC format, which can have 525 lines of resolution. As another example, the system 200 can access a standard definition television video program.

As another example and as shown in FIG. 4, the system 200 accesses a standard definition television video program (410). The standard definition television video program has a frame rate of 29.97 frames per second (FPS) and has a resolution of 720×486. The standard definition television video program can be processed with interlacing and field interpolation.

The standard definition television video program is based on an RGB (Red, Green, Blue) colorimetry platform. An RGB color colorimetry platform can use an additive color space that is based on a RGB color model. A particular RGB color space can be defined by three chromaticies of red, green, and blue additive primaries, and can produce any chromaticity that can be represented as a tuple defined by percentages or values of red, green, and blue amounts.

In some implementations, an original analog version of the standard definition television video program is accessed. In some implementations, a digital version that includes information encoded from an original analog version is accessed. If an original analog version is accessed, a decoding process can be performed to create a digital version, such as by using a three-dimensional comb decoder with 12 bit analog to digital conversion.

The standard definition television video program can include degradations resulting from encoding and recording processes, including analog recording deficiencies used during an original capture. For example, use of analog magnetic oxide tapes and subsequent duplication of those tapes may have introduced analog tape noise, differential gain and phase distortions, and loss of recorded RF (Radio Frequency) energy and drop-out of signals recorded on the magnetic tape. Such degradations can result in visual impairments embedded in the original recordings.

Referring again to FIG. 3, the system 200 extracts, from the first stream of video content, multiple, different layers (320). In some implementations, first, second, and third layers can be extracted, where the second layer is different than the first layer and the third layer is different than the first layer and the second layer. For example, a set of first images of a scene can be extracted from the first stream of video content into the first layer. A set of second images of the scene can be extracted from the first stream of video content into the second layer, where the second images of the scene are a different representation of the scene than the first images. Similarly, a set of third images of the scene can be extracted from the first stream of video content into the third layer, where the third images of the scene are a different representation of the scene than the first images and the second images.

As another example, the system 200 can extract multiple, different layers that each have the first resolution. For example, each of the multiple, different layers can be a color layer that corresponds to a different color. For example and as shown in FIG. 4, the system 200 extracts from the standard definition television video program a red color layer (220A), a green color layer (220B), and a blue color layer (220C). The green color layer is a different layer than the red color layer and the blue color layer is a different layer than the green color layer and the blue color layer. The extraction of the red color layer, the green color layer, and the blue color layer can involve, for example, identifying red, green, or blue color values in the standard definition television video program and separating the identified red, green, or blue color values into the respective red, green, or blue color layer. In some implementations, extracting the red, green, and blue color layers includes extracting, from the standard definition television video program, first, second, and third images of a scene that reflect red color values, green color values, and blue color values of the scene, respectively.

In some implementations, the extractions of the red color layer, the green color layer, and the blue color layer are performed using a three-line adaptive comb filter technique. A comb filter applies a mathematical combing process to a luminance signal in a fashion similar to vertical lines of a comb, and can filter color information from the standard definition television video program. In some implementations, a 3D (Three Dimensional) digital comb filter is used, which can provide a greater degree of accuracy than a non-digital filter and can reduce dot crawl and cross color artifacts which can occur in three line comb filter results.

Referring again to FIG. 3, the system 200 separately processes each of the multiple, different layers to convert them into modified layers having higher resolution (330). For instance, the system 200 can process the first, second, and third layers to convert the first, second, and third layers into modified first, second, and third layers, respectively, where the modified second layer is different than the modified first layer and the modified third layer is different than the modified first layer and the modified second layer. For instance, in implementations where first, second and third images of a scene are extracted from the first stream of the video content, the system 200 can process the first images of the scene to convert the first images of the scene into modified first images of the scene that have a higher resolution than the first images of the scene, process the second images of the scene to convert the second images of the scene into modified second images of the scene that have a higher resolution than the second images of the scene, and process the third images of the scene to convert the third images of the scene into modified third images of the scene that have a higher resolution than the third images of the scene.

As another example and as shown in FIG. 4, the system 200 can separately process each of multiple, different color layers to convert the multiple, different color layers into modified color layers that each correspond to a different color. For example, the system 200 can process the red color layer to convert the red color layer into a modified red color layer (430A), process the green color layer to convert the green color layer into a modified green color layer that is different than the modified red color layer (430B), and process the blue color layer to convert the blue color layer into a modified blue color layer that is different than the modified red color layer and the modified green color layer (430C).

In implementations where first, second, and third images of a scene are extracted, processing the red, green, and blue color layers can include processing the first images of the scene to convert the first images of the scene into modified first images of the scene that reflect red color values of the scene at a higher resolution than the first images of the scene, processing the second images of the scene to convert the second images of the scene into modified second images of the scene that reflect green color values of the scene at a higher resolution than the second images of the scene, and processing the third images of the scene to convert the third images of the scene into modified third images of the scene that reflect blue color values of the scene at a higher resolution than the third images of the scene.

A number of sub-processing steps can be performed in each of the steps 430A, 430B, and 430C. The sub-processing steps can be used to improve the resolution of each of the modified red, green, and blue color layers as compared to the respective red, green, and blue color layers. The extracted red, green, and blue color layers can include degradation of cross-color/luma-chroma crosstalk contamination (e.g., a "rainbow" effect), which can be caused by varying luminance signal frequencies crossing at a coincident points.

The steps 430A, 430B, and 430C can each include sub-processing operations that include any combination of blurring, de-interlacing, resizing, and speed-changing. In some implementations, the steps 430A, 430B, and 430C can include sharpening and/or chromatic adjustment sub-processing. The speed changing can be used to change a frame rate of each of the red, green, and blue color layers from 29.97 frames per second to a frame rate of 23.98 frames per second for each of the modified red, green, and blue color layers.

The blurring sub-processing can include frame by frame detection and blurring of channel edges in a respective red, green, or blue color layer. The blurring sub-processing can improve resolution included in the body of an image. The sharpening sub-processing can include application of a sharpening mask to a respective red, green, or blue color layer. The sharpening mask can be applied so that edges do not become over-sharpened and so that noise in an extracted color layer is not amplified.

The standard definition television video program can include interlaced video. The interlaced video can include images that are split into two images. Each half of an image can be stored in a field, and fields can be interlaced with each other as odd and even fields. Using interlaced video can increase the bandwidth of the video. The de-interlacing sub processing can include processing odd-and-even field based images into single frames, including interpolating with motion tracking estimation. In some implementations, each of the red, green, and blue color layers are separately de-interlaced. In some implementations, frames of the standard definition television video program are de-interlaced into combined frames, and the red, green, and blue color layers are extracted from the combined frames.

As mentioned, the standard definition television video program may have a resolution of 720×486. The resizing sub-processing can resize images included in each of the modified red, green, and blue color layers to have a resolution of 1480×1080 (e.g., a resolution associated with HD television programming). For example, pixels included in each of the modified red, green, and blue color layers can be re-sampled on a field by field basis to generate a new picture frame that includes 1480 pixels horizontally by 1080 lines. Such a picture frame can be used for a full top to bottom HD mapped picture when displayed on a HD television. The re-sampling process can preserve the aspect ratio of an original standard definition image.

The system 200 can perform a chromatic adjustment process on each of the modified red, green, and blue color layers (440). A chromatic adjustment process can be performed to compensate for degradation and loss of color intensity information from analog processes used in recording the standard definition television video program. A modified red, blue or green color layer can be adjusted by a manipulation of a red, green, or blue color space, such as by adding, subtracting or multiplying channels on an isolated basis to restore contrast and colors which had been reduced by encoding/decoding processes. Chromatic adjustment can be accomplished by computing equipment with a series of software processes which can be under the control of a colorist user who can control a subjective look of an adjusted color layer. Values for chromatic adjustment for each color layer may be stored in a table and the table may be referenced to perform the chromatic adjustment of each color layer.

Referring again to FIG. 3, the system 200 reassembles the modified layers into a second stream of the video content that has a higher resolution than the first stream of the video content (340). For instance, in implementations where first, second and third images of a scene are extracted from the first stream of the video content, the system 200 can reassemble the modified first images of the scene, the modified second images of the scene, and the modified third images of the scene into the second stream of the video content. As another example, the system 200 can perform a chromatic level adjustment process that weights, in the second stream of the video content, a first color layer included in the modified color layers more heavily than a second, different color layer included in the modified color layers.

As another example and as shown in FIG. 4, the modified red color layer, the modified green color layer, and the modified blue color layer can be reassembled into a modified high definition television video program (450). The modified high definition television video program has a frame rate of 23.98 frames per second, has a resolution of 1480×1080 (e.g., higher than the standard definition television video program), is based on an RGB colorimetry platform, and is based on a progressive format in which a full frame is displayed after another full frame (e.g., in contrast to interlaced video). Although the above description described a chromatic adjustment process as being performed separately on each of the modified red, green, and blue color layers, in some implementations, instead of or in addition to such processing, a chromatic adjustment process can be performed on a combined file which includes a reassembly of the modified red, green, and blue color layers.

Reassembly processing can include identification of features in each of the modified red, green, and blue color layers and determination of alignment vectors for matching and aligning features identified in one layer to features identified in the other layers. Feature identification and alignment can be performed, for example, to correct for the modified red, green, and blue layers not being exactly the same size and not having exactly the same content at exactly the same positions. The feature identification and alignment can correct for shifting of features in the respective modified red, green, and blue color layers. Features can include, for example, edges, objects, contours and other items. An alignment vector can be determined, for example, by comparing sets of edges identified in each of the modified red, green, and blue layers. One of the red, green, and blue modified color layers can be used as a reference layer and the other two of the modified red, green, and blue color layers can be aligned to the reference layer.

Referring again to FIG. 3, the system 200 stores, in electronic storage, the second stream of the video content (350). For instance, the system 200 can store the second stream of the video content in the data store 220. The system 200 also may record the second stream of the video content onto a device readable medium, such as a DVD, a Blu-Ray Disc, a HDCAM SR videocassette, a FireWire drive, or other suitable content medium, such as in a DPX (Digital Picture Exchange), QuickTime (e.g., a .MOV file), D-5, or LTO (Linear Tape Open) format, to name a few examples.

Figure 5:
FIGS. 5 and 6 are examples of converted video images.

FIG. 5 illustrates example images 510 and 520 that result from two, different conversion processes that increase resolution of an image. As shown, the image 510 was processed using a traditional upconversion process involving real-time processing usually associated with electronic recursive noise reducers and image enhancement which attempt to process the video fields and frames in real time. The upconversion process can be designed to interface with equipment, such as a digital video disc player and/or with a Betacam, Digital Betacam, one-inch, or other digital or analog tape deck, in real-time, and such a design can impose restrictions on the upconversion process. The upconversion process can be designed to "blow up" a lower resolution image. Such a process can magnify degradation artifacts from encoding/decoding processes used to produce the lower resolution image.

Figure 6:
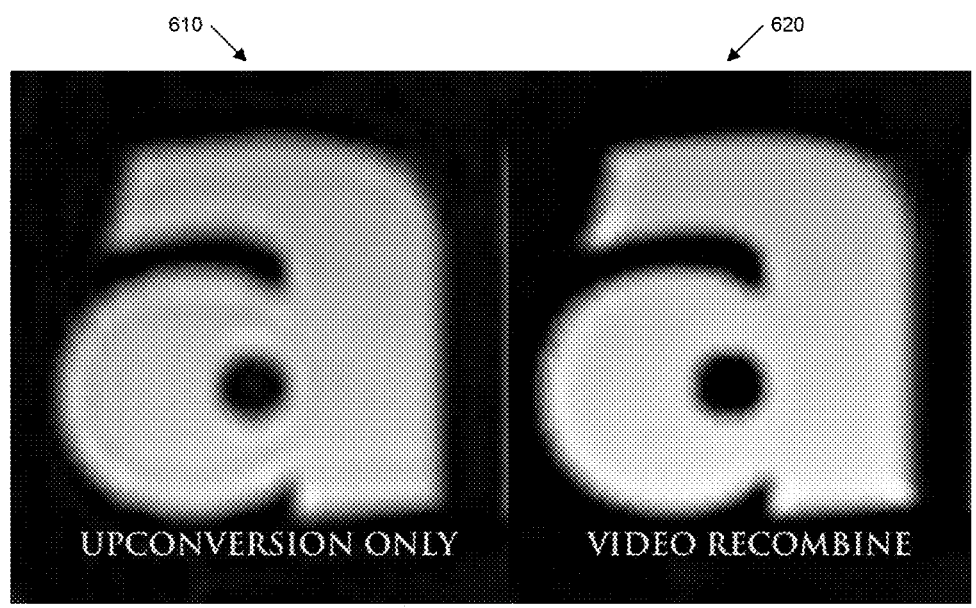

As shown, the image 520 was processed using the extraction, processing, reassembly, and storing processes described for the process 400. The image 520, like the image 510, has an increased resolution as compared to a source image, but the image 520 includes less noise and distortion as compared to the image 510. FIG. 6 illustrates example magnified images 610 and 620 which are magnifications of letter "a" content included in the image 510 and image 520, respectively. The inclusion of less noise and distortion in the image 620 as compared to the image 610 is visually apparent.

Figure 7:
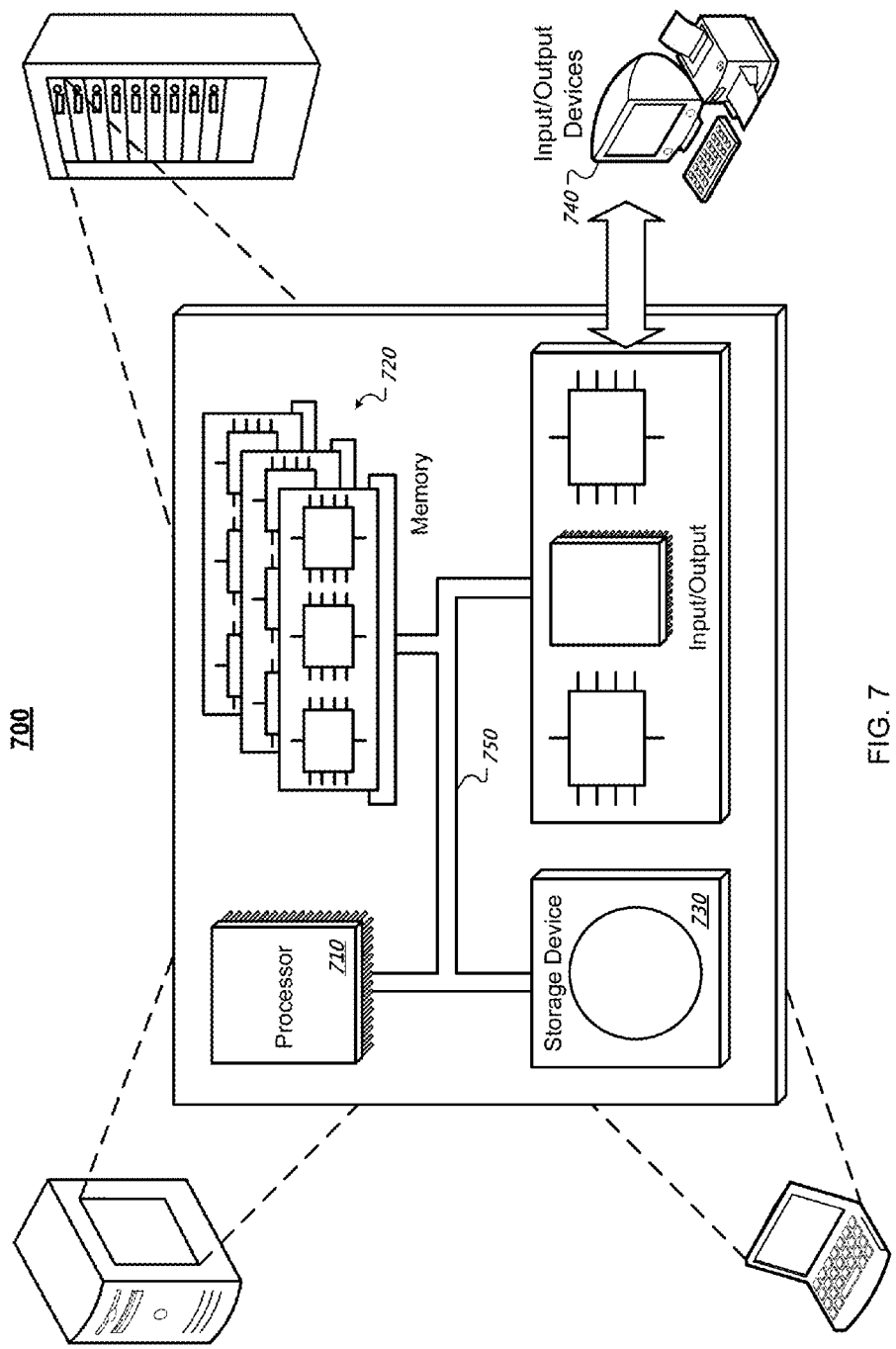

FIG. 7 is a schematic diagram of an example of a generic computer system 700. The system 700 can be used for the operations described in association with the processes 300 and 400, according to some implementations. The system 700 may be included in the systems 100 and 200.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   accessing, from an electronic storage, a first stream of video content, the first stream of the video content having a first resolution;
   extracting, from the first stream of the video content, multiple, different color layers that each correspond to a different color and have the first resolution;
   separately processing and re-sampling each of the multiple, different color layers to convert the multiple, different color layers into modified layers that each have a second resolution that is higher than the first resolution;
   separately adjusting a chromatic level of each of the modified layers;

reassembling, by at least one processor, the modified layers into a second stream of the video content, the second stream of the video content having the second resolution that is higher than the first resolution; and storing, in an electronic storage, the second stream of the video content.

2. The method of claim 1:

wherein extracting, from the first stream of the video content, multiple, different color layers that each have the first resolution comprises:

extracting, from the first stream of the video content, a first color layer;

extracting, from the first stream of the video content, a second color layer that is different than the first color layer; and extracting, from the first stream of the video content, a third color layer that is different than the first color layer and the second color layer;

wherein separately processing each of the multiple, different color layers to convert the multiple, different color layers into modified layers that each have a second resolution that is higher than the first resolution comprises:

processing the first color layer to convert the first color layer into a modified first color layer;

processing the second color layer to convert the second color layer into a modified second color layer that is different than the modified first color layer; and processing the third color layer to convert the third color layer into a modified third color layer that is different than the modified first color layer and the modified second color layer; and wherein reassembling the modified layers into the second stream of the video content comprises reassembling the modified first color layer, the modified second color layer, and the modified third color layer into a second stream of the video content.

3. The method of claim 2:

wherein extracting, from the first stream of the video content, the first color layer comprises extracting, from the first stream of the video content, a red color layer;

wherein extracting, from the first stream of the video content, the second color layer that is different than the first color layer comprises extracting, from the first stream of the video content, a green color layer that is different than the red color layer;

wherein extracting, from the first stream of the video content, the third color layer that is different than the first color layer and the second color layer comprises extracting, from the first stream of the video content, a blue color layer that is different than the red color layer and the green color layer;

wherein processing the first color layer to convert the first color layer into the modified first color layer comprises processing the red color layer to convert the red color layer into a modified red color layer;

wherein processing the second color layer to convert the second color layer into the modified second color layer that is different than the modified first color layer comprises processing the green color layer to convert the green color layer into a modified green color layer that is different than the modified red color layer;

wherein processing the third color layer to convert the third color layer into a modified third color layer that is different than the modified first color layer and the modified second color layer comprises processing the blue color layer to convert the blue color layer into a modified blue color layer that is different than the modified red color layer and the modified green color layer; and wherein reassembling the modified first color layer, the modified second color layer, and the modified third color layer into the second stream of the video content comprises reassembling the modified red color layer, the modified green color layer, and the modified blue color layer into the second stream of the video content.

4. The method of claim 3:

wherein extracting, from the first stream of the video content, the red color layer comprises identifying red color values in the first stream of the video content and separating the identified red color values into the red color layer;

wherein extracting, from the first stream of the video content, the green color layer comprises identifying green color values in the first stream of the video content and separating the identified green color values into the green color layer; and wherein extracting, from the first stream of the video content, the blue color layer comprises identifying blue color values in the first stream of the video content and separating the identified blue color values into the blue color layer.

5. The method of claim 3:

wherein extracting, from the first stream of the video content, the red color layer comprises extracting, from the first stream of the video content, first images of a scene that reflect red color values of the scene;

wherein extracting, from the first stream of the video content, the green color layer that is different than the red color layer comprises extracting, from the first stream of the video content, second images of the scene that reflect green color values of the scene;

wherein extracting, from the first stream of the video content, the blue color layer that is different than the red color layer and the green color layer comprises extracting, from the first stream of the video content, third images of the scene that reflect blue color values of the scene;

wherein processing the red color layer to convert the red color layer into the modified red color layer comprises processing the first images of the scene to convert the first images of the scene into modified first images of the scene that reflect red color values of the scene at a higher resolution than the first images of the scene;

wherein processing the green color layer to convert the green color layer into the modified green color layer that is different than the modified red color layer comprises processing the second images of the scene to convert the second images of the scene into modified second images of the scene that reflect green color values of the scene at a higher resolution than the second images of the scene;

wherein processing the blue color layer to convert the blue color layer into the modified blue color layer that is different than the modified red color layer and the modified green color layer comprises processing the third images of the scene to convert the third images of the scene into modified third images of the scene that reflect blue color values of the scene at a higher resolution than the third images of the scene; and wherein reassembling the modified red color layer, the modified green color layer, and the modified blue color layer into the second stream of the video content comprises reassembling the modified first images of the scene, the modified second images of the scene, and the modified third images of the scene into the second stream of the video content.

6. The method of claim 1:
wherein accessing the first stream of video content comprises accessing a first stream of video content with a 29.97 frame rate and 525 lines of resolution, the first stream of video content being based on a red, green, and blue colorimetry platform;
wherein extracting, from the first stream of the video content, multiple, different color layers that each correspond to a different color and have the first resolution comprises extracting, from the first stream of the video content, red, green, and blue layers that each have a 29.97 frame rate and 525 lines of resolution;
wherein separately processing and re-sampling each of the multiple, different color layers to convert the multiple, different color layers into modified layers that each have a second resolution that is higher than the first resolution comprises separately processing each of the red, green, and blue layers to convert the red, green, and blue layers into modified red, green, and blue layers that each have a 23.98 frame rate and 1080 lines of resolution;
wherein separately adjusting the chromatic level of each of the modified layers comprises separately adjusting a chromatic level of each of the modified red, green, and blue layers that each have a 23.98 frame rate and 1080 lines of resolution; and
wherein reassembling the modified layers into the second stream of the video content comprises reassembling the modified red, green, and blue layers into a second stream of the video content with a 23.98 frame rate and 1080 lines of resolution.

7. A video conversion system comprising:
at least one processor; and
at least one memory coupled to the at least one processor having stored thereon instructions which, when executed by the at least one processor, causes the at least one processor to perform operations comprising:
accessing, from an electronic storage, a first stream of video content, the first stream of the video content having a first resolution;
extracting, from the first stream of the video content, multiple, different color layers that each correspond to a different color and have the first resolution;
separately processing and re-sampling each of the multiple, different color layers to convert the multiple, different color layers into modified layers that each have a second resolution that is higher than the first resolution;
separately adjusting a chromatic level of each of the modified layers;
reassembling, by at least one processor, the modified layers into a second stream of the video content, the second stream of the video content having the second resolution that is higher than the first resolution; and
storing, in an electronic storage, the second stream of the video content.

8. At least one computer-readable storage medium encoded with executable instructions that, when executed by at least one processor, cause the at least one processor to perform operations comprising:
accessing, from an electronic storage, a first stream of video content, the first stream of the video content having a first resolution;
extracting, from the first stream of the video content, multiple, different color layers that each correspond to a different color and have the first resolution;
separately processing and re-sampling each of the multiple, different color layers to convert the multiple, different color layers into modified layers that each have a second resolution that is higher than the first resolution;
separately adjusting a chromatic level of each of the modified layers;
reassembling, by at least one processor, the modified layers into a second stream of the video content, the second stream of the video content having the second resolution that is higher than the first resolution; and
storing, in an electronic storage, the second stream of the video content.

9. The method of claim 1:
wherein the video content comprises video content originally captured and stored on a first electronic storage of a first type from which the first stream of video content is accessed;
wherein the second stream of the video content is stored in a second electronic storage of a second, different type.

10. The method of claim 1:
wherein reassembling the modified layers into a second stream of the video content, the second stream of the video content having the second resolution that is higher than the first resolution, comprises identifying at least one feature in each of the modified layers, and
aligning the at least one feature of each modified layer with at least one feature of each other modified layer, respectively.

11. The method of claim 1:
wherein the first stream of video content having the first resolution comprises visual distortion occupying a first percentage of units of the first resolution; and
wherein the second stream of video content having the second resolution comprises visual distortion occupying a second percentage of units of the second resolution, the second percentage being less than the first percentage.

12. The method of claim 1:
wherein storing the second stream of the video content comprises recording the second stream of the video content onto an electronic storage.

* * * * *